United States Patent [19]

Dagenhart

[11] Patent Number: 4,596,687
[45] Date of Patent: Jun. 24, 1986

[54] NEUTRAL PARTICLE BEAM INTENSITY CONTROLLER

[75] Inventor: William K. Dagenhart, Oak Ridge, Tenn.

[73] Assignee: The United States of America as represented by the United States Department of Energy, Washington, D.C.

[21] Appl. No.: 617,197

[22] Filed: May 29, 1984

[51] Int. Cl.$^4$ ............................................. G21B 1/00
[52] U.S. Cl. ................................... 376/130; 376/147; 250/251; 250/396 R; 313/361.1
[58] Field of Search .................... 376/127, 130, 147; 313/361.1; 250/251, 396 R, 396 ML, 398

[56] References Cited

U.S. PATENT DOCUMENTS 4,101,765 7/1978 Hooper, Jr. ..................... 250/251
4,349,505 9/1982 Stirling ............................... 376/147

OTHER PUBLICATIONS

Proc. of the 7th Symp. on Engineering Problems of Fusion Research, Knoxville, Tenn. 10/77, pp. 549-554, Colleraine et al.

Primary Examiner—Harvey E. Behrend
Attorney, Agent, or Firm—David E. Breeden; Stephen D. Hamel; Judson R. Hightower

[57] ABSTRACT

A neutral beam intensity controller is provided for a neutral beam generator in which a neutral beam is established by accelerating ions from an ion source into a gas neutralizer. An amplitude modulated, rotating magnetic field is applied to the accelerated ion beam in the gas neutralizer to defocus the resultant neutral beam in a controlled manner to achieve intensity control of the neutral beam along the beam axis at constant beam energy. The rotating magnetic field alters the orbits of ions in the gas neutralizer before they are neutralized, thereby controlling the fraction of neutral particles transmitted out of the neutralizer along the central beam axis to a fusion device or the like. The altered path or defocused neutral particles are sprayed onto an actively cooled beam dump disposed perpendicular to the neutral beam axis and having a central open for passage of the focused beam at the central axis of the beamline. Virtually zero therough 100% intensity control is achieved by varying the magnetic field strength without altering the ion source beam intensity or its species yield.

4 Claims, 3 Drawing Figures

NEUTRAL PARTICLE BEAM INTENSITY CONTROLLER

REFERENCE

U.S. Pat. No. 4,349,505 issued Sept. 14, 1982 to William L. Stirling for Neutral Beamline with Ion Energy Recovery Based on Magnetic Blocking of Electrons, the subject matter of which is incoporated herein by reference thereto.

BACKGROUND OF THE INVENTION

This invention relates generally to neutral beam generators and more specifically to intensity controllers for neutral beam generators.

This invention is a result of a contract with the United States Department of Energy.

In the development of various fusion energy devices, such as the Mirror Fusion Test Facility (MFTF), a neutral particle beam is used as one source of heating the plasma. The neutral beam is transmitted to the device through a defining aperture ($\sim \pm 0.3°$) to the MFTF plasma. The neutral beam must be variable in intensity (particle current) over a range of at least 30% to 100% of full scale at a fixed energy.

In order to meet this requirement, some means of control is needed that is external of the neutral beamline ion source. The reason is that if the ion source is detuned at constant energy in order to vary the neutral beam intensity, it impairs the source reliability, lowers the full energy species yield, and puts an intolerably high power loading on ion source grids and on beamline aperature plates. With the detuning method the throttled beam of neutral particles would not have the same energy spectrum as when operated under full power conditions.

SUMMARY OF THE INVENTION

In view of the above need it is an object of this invention to provide a means of varying the intensity of a neutral particle beam without altering the output of the neutral beam generator ion source.

Other objects and many of the attendant advantages of the present invention will be apparent to those skilled in the art from the following detailed description of one embodiment of the invention taken in conjunction with the drawings.

Briefly, the neutral beam intensity controller of this invention, wherein the neutral beam is generated by accelerating ions along a beam path through a gas neutralizer, is based on selected magnetic defocusing of the ion beam prior to neutralization. The defocused portion of the beam is dumped onto a beam dump disposed perpendicular to the beam axis. Selective defocusing is accomplished by means of a magnetic field generator disposed about the neutralizer so that the field is transverse to the beam axis. The magnetic field intensity is varied to provide the selected partial beam defocusing of the ions prior to neutralization. The desired focused neutral beam portion passes along the beam path through a defining aperture in the beam dump, thereby controlling the desired fraction of neutral particles transmitted to a utilization device without altering the kinetic energy level of the desired neutral particle fraction. By proper selection of the magnetic field intensity, virtually zero through 100% intensity control of the neutral beam is achieved.

In accordance with the preferred embodiment of the invention, a rotating magnetic field is employed to spread the dumped portion of the neutral beam over the entire beam dump surface of an annular beam dump surrounding the beam axis, thereby reducing the time averaged surface beam power density on the actively cooled beam dump.

BRIEF DESCRIPTION OF THE DRAWINGS

The accompanying drawings, which are incorporated in and form a part of this specification, illustrate a preferred embodiment of this invention and, together with the description, serve to explain the principles of the invention.

DETAILED DESCRIPTION

Figure 1:
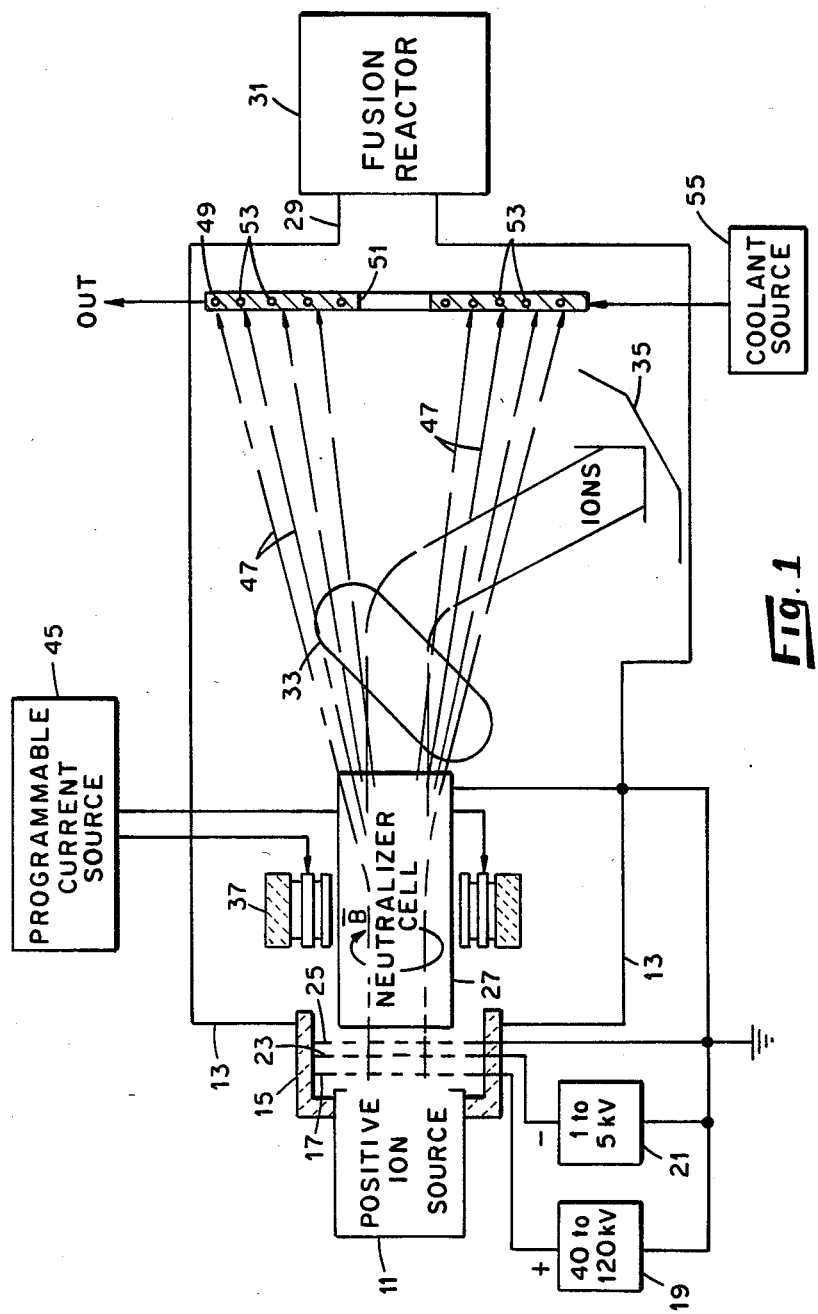
FIG. 1 is a schematic diagram of a neutral beamline generator incorporating a neutral beam intensity controller according to the present invention.

Referring now to FIG. 1, there is shown schematically a neutral beamline modified in accordance with the present invention to include a magnetically operated neutral beam intensity controller for selectively controlling the neutral particle beam intensity. A light isotopic species positive ion source 11 is operated at high positive potential, typically +40 to +120 kv for a source of hydrogen or deuterium ions. The ion source may be mounted to a vacuum enclosure 13 for the beamline system by means of an electrical insulator and seal assembly 15. The ion beam from the source 11, is accelerated by means of a power source 19 connected between ground and the plasma grid 17 of the source 11. A slight decel voltage typically 1 to 5 kv negative is applied by means of a power source 21 between ground and the acceleration grid 23 of the ion source. The exit grid 25 of the source is tied to ground potential. The negative decel voltage applied between the acceleration grid 23 and the exit grid 25 prevents electrons generated in the neutralized cell 27 from drifting back into the ion source 11.

The beam of positive ions extracted from the ion source 11 is thus accelerated to ground potential and remains at ground potential as it passes through the gas cell neutralizer 27 by connecting the neutralizer cell to ground potential. In the gas cell, some of the positive ions entering the cell are converted to focused neutral particles with high kinetic energy and normally travel along the accelerated beam path axis and into an evacuated drift duct 29 coupled to a neutral beam utilization device, such as a fusion reactor 31 to heat a magnetically confined reactor plasma.

A magnet assembly 33, located along the beamline a short distance from the exit end of the neutralizer cell 27 is arranged to deflect the residual positive ions from the neutral beamline onto an ion beam dump 35. The magnet assembly 33 includes two separate pole pieces, one on each side of the beam, so that a magnetic field is generated transverse to the beam to cause the ions to deflect onto the ion dump 35. Further, details of such a deflecting magnet assembly may be had by referring to the above-referenced U.S. Pat. No. 4,349,505.

Figure 2:
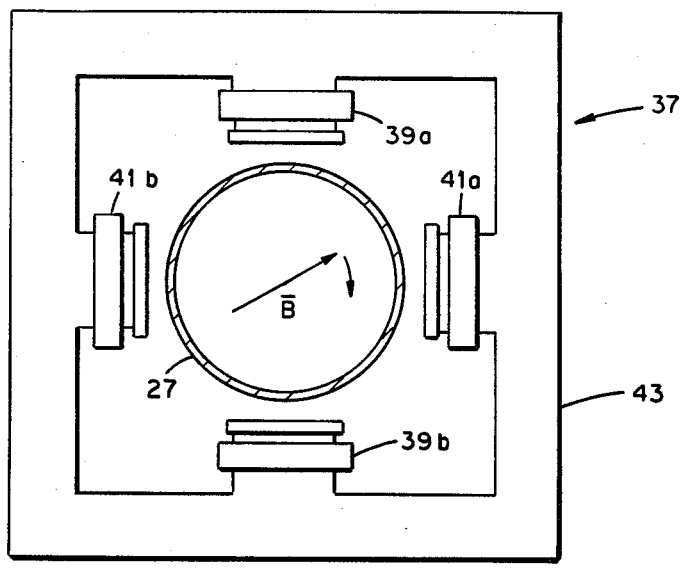
FIG. 2 is a cross-sectional view of the neutralizer cell 27 of FIG. 1 illustrating one embodiment of an electromagnet assembly which may be used to generate a rotating magnetic field $\vec{B}$ within the neutralizer cell.
Figure 3:
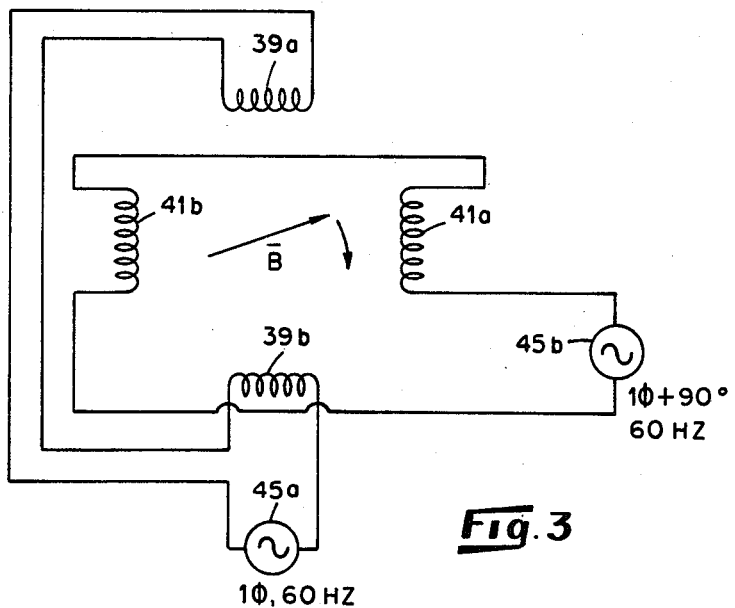
FIG. 3 is a schematic diagram illustrating the connections of the current sources to the coils of the magnet assembly shown in FIG. 2 to generate the rotating magnetic field vector $\vec{B}$.

In accordance with the present invention, the neutralizer 27 is modified to include an electromagnet assembly 37 disposed about the neutralizer 27, as more clearly shown in FIG. 2, to generate a rotating magnetic field vector $\overline{B}$ within the neutralizer 27. As illustrated in FIG. 2, two sets of magnetic field coils 39, 41 each consisting of opposed coil pairs a and b are wound on a soft iron laminated flux-return-path yoke 43 with pole faces for each coil mounted closely adjacent to the exterior of the neutralizer cell 27. The preferred embodiment for two coil sets would utilize a sine $\theta$ ampere turns distribution on each coil set to generate a uniform rotating magnetic field. Although only two coil pairs have been illustrated in FIG. 2, it will be understood that a rotating field generator may also be used which includes a larger number of opposed coil pairs in which the coil pair currents are suitably phased in time to generate the rotating magnetic field. The currents are fed to the coils from a programmable current source 45 to generate a rotating magnetic field vector within the neutralizer which may also be amplitude modulated in a conventional manner by programming the source 45 or by manual adjustment of source currents applied to the coil pairs. The coils 39a through 41b may be connected as shown in FIG. 3 to appropriately phased a.c. current sources 45a and 45b of the programmable current source 45. In this case the separate coil pairs are fed by currents which are 90° out-of-phase so that two magnetic fields are generated by the coil pairs 39 and 41 which are oriented 90° to each other. The result is a rotating magnetic field vector $\overline{B}$. The rotating magnetic field may be intensity modulated in time by an in-phase amplitude modulation of the two coil currents in a conventional manner.

The magnetic field defocuses the ions by deflecting the ions entering the neutralizer 27 from their normal beam path parallel to the beam line axis prior to becoming neutralized in the neutralizer. To accomplish this, the magnet assembly 37 is located near the ion source but not so close that the generated magnetic field interferes with the ion source operation. Once these deflected ions are neutralized by interaction with the background gas, they continue along deflected paths, as shown by broken neutral beam lines 47 emerging from the downstream end of the neutralizer 27, and are dumped onto a neutral beam dump panel 49. The ions which are not neutralized are swept from the neutral beam by the ion deflection magnet assembly 33 onto the ion beam dump 35.

The degree of defocusing of the ion beam entering the neutralizer prior to neutralization depends on the intensity of the applied magnetic field which correspondingly alters the ion gyroradii. With no magnetic field applied, the beam continues along the normal beam path through a central opening 51 in the beam dump panel 49 and into the reactor 31, or other utilization device. As the magnetic field intensity is increased, the ion defocusing is increased causing more of the neutral particles emerging from the neutralizer to be directed along paths at angles to the beam axis and thus intercepted by the beam dump panel 49. Thus, the intensity of the neutral beam passing through the port 51 and into the drift duct 29 is controlled by the intensity of the magnetic field applied perpendicular to the beam axis within the neutralizer 27. The intensity may be varied from virtually zero up to 100% of the available neutral beam from the neutralizer.

The beam dump 49, which is mounted perpendicular to the normal beam axis, may take the form of an annular actively-cooled beam dump in which water, or other suitable coolant, is passed through cooling channels 53 in the dump panel, from a coolant source 55. Further, the neutral particles are sprayed about the annular surface of the beam dump in a rotating manner by rotating the magnet field. This lowers the average surface power density which the beam dump must absorb and allows existing technology beam dump designs to be used to dump even the completely defocused neutral beams of very high power without destroying the beam dump surface. The magnetic field may be rotated at various speeds by proper modulation of the current to the magnet assembly 37 field coil windings. Modulation frequency of the coil current up to at least 60 Hz is readily obtained. When not in use, the magnet assembly's iron frame shields the neutralizer cell 27 from the magnetic fields of the fusion device to provide full beam output.

Thus, it will be seen that a very effective means has been provided for controlling the neutral beam intensity of a neutral beam generator which does not require altering the energy level of the neutral particles of the beam being controlled.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A neutral beam generator wherein an energetic neutral particle beam is formed from a focused beam of ions accelerated along a beam axis into a neutralizer cell disposed about said beam axis, a neutral beam intensity controller, said controller comprising:
    a neutral particle beam dump disposed with a beam dump surface transverse to said beam axis downstream of said neutralizer and having an opening therethrough for the passage of neutral particles focused along said beam axis;
    means for generating a magnetic field within said neutralizer perpendicular to said beam axis adjacent to the upstream end of said neutralizer; and
    control means operatively connected to said magnetic field generating means for selectively controlling the intensity of said magnetic field within said neutralizer in order to defocus a portion of said beam of ions prior to neutralization in said neutralizer to direct the neutral particles generated from the defocused portion of said ion beam along paths which are intercepted by said beam dump surface of said beam dump, thereby controlling the intensity of neutral particles passing through said opening in said beam dump.

2. The neutral beam intensity controller as set forth in claim 1 wherein said means for generating a magnetic field includes means for generating a rotating magnetic field perpendicular to said beam axis and wherein said beam dump includes an annular beam dump surface coaxially disposed about said beam axis so that the defocused particles are sprayed in a rotating manner about said beam dump surface to lower the time averaged beam power density absorbed by the dump surface.

3. The neutral beam intensity controller as set forth in claim 3 wherein said magnetic field generating means includes a plurality of electromagnetic coil pairs, the respective coils of each pair being disposed on opposite sides of said neutralizer from each other and means for activating said electromagnetic coil pairs in a separate phased relationship to generate said rotating magnetic field within said neutralizer.

4. The neutral beam intensity controller as set forth in claim 3 wherein said control means includes means for selectively varying the amplitude of the current through said plurality of electromagnetic coil pairs to correspondingly vary the intensity of the rotating magnetic field so that the intensity of the neutral particle beam passing through said opening in said beam dump may be varied from virtually zero to 100%.

* * * * *